Aug. 2, 1932.  C. W. LEGUILLON  1,869,598
VULCANIZING APPARATUS
Filed May 1, 1929
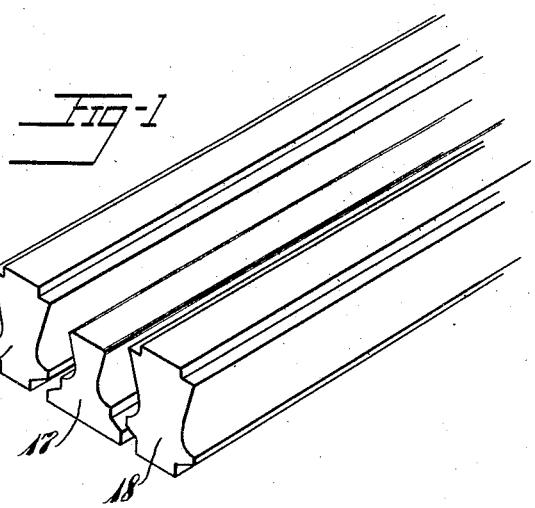
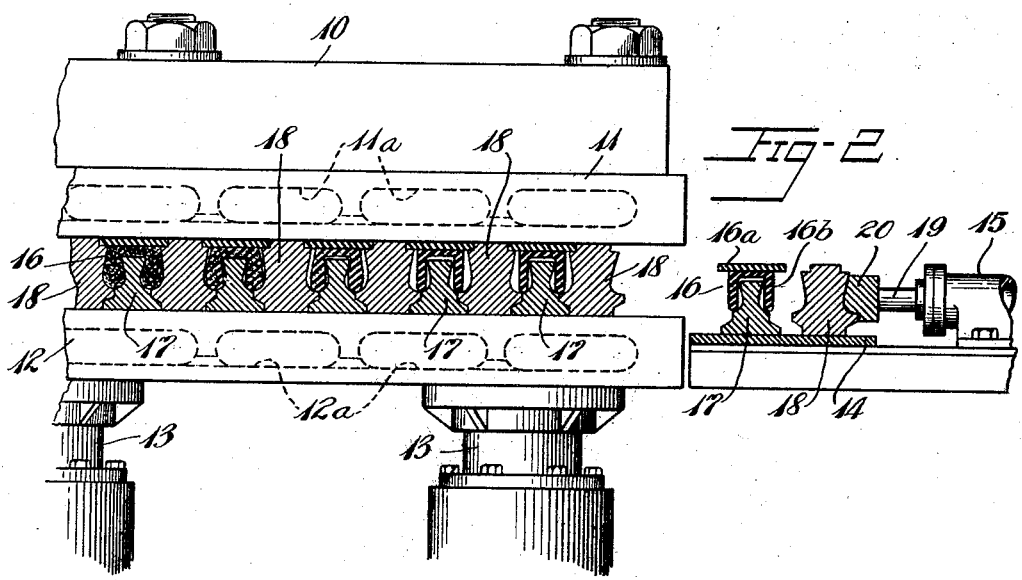
Inventor
Charles W. Leguillon
By Eakin & Avery
Attys Patented Aug. 2, 1932

1,869,598

UNITED STATES PATENT OFFICE

CHARLES W. LEGUILLON, OF AKRON, OHIO, ASSIGNOR TO THE B. F. GOODRICH COMPANY, OF NEW YORK, N. Y., A CORPORATION OF NEW YORK

VULCANIZING APPARATUS

Application filed May 1, 1929. Serial No. 359,488.

This invention relates to vulcanizing apparatus, and more especially to apparatus for molding and vulcanizing a continuous succession of articles.

The chief objects of the invention are to provide an improved vulcanizing apparatus by which the manufacture of articles may be expedited; to provide molding members of simple form for use therewith; and in general to effect economies in the manufacture of molded vulcanized articles. Other objects will be manifest in the following specification.

The invention is usefully employed in the manufacture of channeled material such as window guide channels for the window panes of automobiles, and especially window guide channels made wholly or partly of cellular rubber which requires to be vulcanized in molds to provide confinement for the cellular rubber to shape the same as it increases in volume during vulcanization. In the embodiment of the invention herein shown, I have illustrated apparatus for vulcanizing window guide channels provided with base reinforcement of stiff fibrous rubber composition and base and leg portions of soft cellular rubber.

Of the accompanying drawing:

Fig. 1 is a perspective view of a plurality of mold sections employed in the practice of my invention in its preferred form.

Fig. 2 is an elevation of apparatus embodying and adapted to carry out my invention in its preferred form, and the work therein, the latter and a part of the apparatus being shown in section.

Fig. 3 is a modified embodiment of my invention.

Referring to the drawing, 10 is a platen press of substantial length, 11, 12, respectively are the upper and lower platens thereof, and 13, 13 are hydraulic rams operable concurrently to raise and lower the lower platen 12. The platens 11, 12 are formed with respective internal steam chambers 11ª, 12ª and are heated in the usual manner. A table 14 of the same length as the width of the platens 11, 12 is positioned at one end of the latter, at a level somewhat below the normal operative level of the platen 12, and a fluid pressure operated cylinder 15 is mounted upon the table 14, in position to push successive mold sections from the table 14 onto the platen 12 when the latter is in lowered position.

As hereinbefore stated, the articles shown in conjunction with my vulcanizing apparatus comprise window-guide channels 16, and each channel comprises a base reinforcement 16ª of relatively stiff fibrous rubber composition, and base and leg portions 16ᵇ of soft cellular rubber composition. The article is shown in unvulcanized condition at the right in Fig. 2 and is shown substantially in vulcanized condition at the left in Fig. 2.

The molds for confining and shaping the channels 16 comprise respective elongate sections 17, 18 of which the section 17 is adapted to be positioned between the leg portions of a channel and the section 18 at one side of the channel, the section 18 being formed with a molding surface on each of its lateral faces. The arrangement is such that when the mold sections 17, 18 are assembled in alternation, in laterally abutting relation, they define a succession of molding cavities for the channels 16. The mold sections 17, 18 are formed with interfitting base portions, and their upper portions are disposed apart from each other as shown so that the base reinforcement 16ª of the channel 16 is engaged on three sides by the mold sections, the other face of said reinforcement being in direct contact with the upper platen 11 of the press 10 when the molds and the work are mounted therein. The molding cavities are larger than the unvulcanized channels to permit the portions thereof composed of cellular rubber to increase in volume during vulcanization.

The piston rod 19 of the fluid pressure cylinder 15 is provided on its outer end with an elongate head 20 having a mold-engaging face shaped complemental to a lateral face of a mold section 18 to permit the head to engage and move successive mold sections 18 laterally while maintaining them in parallel relation.

In the operation of the apparatus, the piston rod 19 of the fluid pressure cylinder 15 being in the retracted position shown, a mold-section 18 is mounted upon the table 14 abutting the piston head 20, and a mold section 17 with an unvulcanized channel 16 thereon is positioned beside the mold section 18 upon said table. The platen 12 of the press 10 is then lowered to the level of the table 14 and the fluid pressure cylinder 15 actuated to move the piston rod 19 outwardly and thereby to move the mold sections 17, 18 into laterally abutting engagement and while so positioned to push them off the table 14 onto the platen 12. The piston rod 19 is then retracted to its normal inoperative position, and the platen 12 elevated to confine the mold members and the work between it and the upper platen 11. This completes one cycle of operation.

The operation described is repeated at periodic intervals, and the successive molds pushed onto the platen of the press engage the mold last mounted thereon to provide a complete molding cavity for the work, and also impel all the mold sections thereon toward the opposite end of the press. The length of the press 10 and the frequency with which successive molds are introduced thereinto are properly co-ordinated so that the work remains in the press for a sufficient interval to effect completely the vulcanization thereof before it is ejected from the delivery end of the press.

The invention provides vulcanizing apparatus which is of relatively simple construction and operation whereby I obtain the several advantages set forth in the foregoing statement of objects.

In the modification shown in Fig. 3, mold sections 17ª, 18ª are formed with apertured extensions 21, 21 on their respective ends, and the mold sections are mounted in parallel relation upon a pair of parallel plates or bars 22, 22 to which they are pivotally secured by suitable fastening means 23, 23. The arrangement is such that the mold sections are disposed in spaced relation when positioned perpendicular to the bars 22, to permit the work to be mounted in the cavities of the molds. The mold is closed upon the work by moving the bars 22 longitudinally with relation to each other in a parallel movement, as indicated by the oblique broken-line position of the mold sections in Fig. 3. The arrangement provides means for concurrently opening or closing a plurality of mold sections, and permits the sections to be handled as a unit.

Other modifications may be resorted to without departing from the scope of my invention, and I do not wholly limit my claims to the specific construction or exact procedure shown and described.

I claim:

1. Vulcanizing apparatus comprising a succession of mating mold bars defining molding cavities between successive bars in combination with a vulcanizing press acting against a plurality of said bars in a direction transverse to that of their mating movement to complete article cavities with said bars and hold said bars in assembled relation.

2. Apparatus as defined in claim 1 including means for advancing the mold bars through the vulcanizing press.

3. Vulcanizing apparatus comprising a succession of mold members, the alternate members of which are of different laterally mating form for molding respectively the interior and exterior surfaces of the articles to be vulcanized, and a vulcanizing press acting against a plurality of said mold sections in a direction transverse to that of their mating movement for holding the members in mating relation and directly heating the articles confined therebetween.

4. Vulcanizing apparatus comprising a succession of mold sections each having molding faces on its opposite sides, a vulcanizing press, and means for advancing the mold sections through the press, said means including a pusher head shaped complemental to molding faces of the mold sections.

5. Vulcanizing apparatus comprising a plurality of dissimilar mold sections adapted to be assembled in abutting relation to define with a press platen an intermediate molding cavity, and a vulcanizing press for applying pressure to said sections in a direction transverse to that of their relative mating movement.

6. Molding apparatus comprising a plurality of mold sections for internal molding, a plurality of mold sections for external molding, said sections being arranged in alternation to provide a series of open sided molding cavities, and a vulcanizing press acting against said mold sections in a direction transverse to that of their mating movement and adapted to close the open sides of said cavities.

In witness whereof I have hereunto set my hand this 26th day of April, 1929.

CHARLES W. LEGUILLON.